United States Patent
Dawson

(10) Patent No.: US 10,135,942 B2
(45) Date of Patent: Nov. 20, 2018

(54) DIFFERENTIATED PRIORITY LEVEL COMMUNICATION

(75) Inventor: Jeffrey William Dawson, Stittsville (CA)

(73) Assignee: BCE INC., Verdun (CA)

( * ) Notice: Subject to any disclaimer, the term of this patent is extended or adjusted under 35 U.S.C. 154(b) by 1643 days.

(21) Appl. No.: 12/343,758

(22) Filed: Dec. 24, 2008

(65) Prior Publication Data

US 2010/0157981 A1 Jun. 24, 2010

Related U.S. Application Data

(63) Continuation of application No. PCT/CA2008/002284, filed on Dec. 23, 2008.

(51) Int. Cl.
H04L 12/66 (2006.01)
H04L 29/08 (2006.01)
H04L 29/06 (2006.01)

(52) U.S. Cl.
CPC .......... H04L 67/303 (2013.01); H04L 67/322 (2013.01); H04L 69/24 (2013.01); *H04L 65/80* (2013.01)

(58) Field of Classification Search
CPC ..... H04W 48/02; H04W 48/18; H04W 24/04; H04W 28/0231; H04W 36/22; H04W 48/08; H04W 48/16; H04W 76/021; H04L 41/12; H04L 63/0876; H04L 67/025; H04L 67/125; H04L 67/141; H04L 2012/6448; H04L 41/0803
USPC ............................................. 370/352, 230.1
See application file for complete search history.

(56) References Cited

U.S. PATENT DOCUMENTS

| | | | |
|---|---|---|---|
| 6,678,280 B1 | 1/2004 | Kim et al. | |
| 7,460,476 B1 * | 12/2008 | Morris et al. | ............... 370/230.1 |
| 8,370,917 B1 * | 2/2013 | Hayes | ..................... H04L 67/22 |
| | | | 713/151 |
| 2002/0103851 A1 | 8/2002 | Kikinis | |
| 2002/0194260 A1 | 12/2002 | Headley et al. | |
| 2003/0107590 A1 * | 6/2003 | Levillain | ........... H04L 29/06027 |
| | | | 715/736 |
| 2005/0207411 A1 | 9/2005 | Ota et al. | |
| 2005/0262258 A1 | 11/2005 | Kohno et al. | |
| 2006/0013230 A1 | 1/2006 | Bosloy et al. | |
| 2006/0050683 A1 | 3/2006 | Wall et al. | |
| 2006/0104249 A1 | 5/2006 | Karaoguz et al. | |

(Continued)

OTHER PUBLICATIONS

International Search Report dated Aug. 20, 2009 in connection with International Patent Application No. PCT/CA2008/002284, 3 pages.

(Continued)

*Primary Examiner* — Asad Nawaz
*Assistant Examiner* — Najeebuddin Ansari

(57) ABSTRACT

Provided are methods, apparatuses and systems for providing prioritized data distribution at a customer premise. A network access component may determine a particular hardware identifier associated with data received from a communication entity. The hardware identifier may uniquely identifying a piece of hardware originating data. The network access component may also determine a particular priority level associated with the data based on the particular hardware identifier. The network access component may also prioritize at least a portion of the data on a basis of the particular priority level.

46 Claims, 9 Drawing Sheets

(56) References Cited

U.S. PATENT DOCUMENTS

| | | |
|---|---|---|
| 2006/0133418 A1 | 6/2006 | Anand |
| 2006/0187942 A1 | 8/2006 | Mizutani et al. |
| 2006/0195847 A1 | 8/2006 | Amano et al. |
| 2006/0221934 A1* | 10/2006 | Cooke et al. ................. 370/352 |
| 2007/0002837 A1 | 1/2007 | Tan |
| 2007/0121584 A1 | 5/2007 | Qiu et al. |
| 2007/0147262 A1* | 6/2007 | Aaron ..................... H04L 63/00 370/250 |
| 2007/0150615 A1 | 6/2007 | Walter et al. |
| 2007/0201472 A1 | 8/2007 | Bhatia et al. |
| 2007/0204036 A1* | 8/2007 | Mohaban ................ H04L 12/66 709/224 |
| 2007/0245157 A1 | 10/2007 | Giobbi et al. |
| 2007/0268506 A1 | 11/2007 | Zeldin |
| 2007/0280277 A1* | 12/2007 | Lund .................... H04L 49/205 370/412 |
| 2008/0056130 A1* | 3/2008 | Desai ................. H04L 12/2801 370/231 |
| 2008/0097858 A1 | 4/2008 | Vucina et al. |
| 2008/0124086 A1 | 5/2008 | Matthews |
| 2008/0162179 A1 | 7/2008 | Bajpay et al. |
| 2008/0212473 A1* | 9/2008 | Sankey et al. ................ 370/235 |
| 2008/0316983 A1* | 12/2008 | Daigle ............. H04L 29/12783 370/338 |
| 2009/0029777 A1* | 1/2009 | Holt ........................ G07F 17/32 463/42 |
| 2009/0067328 A1* | 3/2009 | Morris et al. .............. 370/230.1 |
| 2009/0147792 A1* | 6/2009 | Anschutz ............ H04L 12/2859 370/395.21 |
| 2009/0170475 A1* | 7/2009 | Ch'ng ................... H04W 12/02 455/411 |
| 2009/0182874 A1* | 7/2009 | Morford ............. H04L 41/5025 709/224 |
| 2009/0225746 A1 | 9/2009 | Jackson et al. |
| 2009/0296566 A1 | 12/2009 | Yasrebl et al. |
| 2010/0202450 A1* | 8/2010 | Ansari ................... G06Q 30/04 370/389 |

OTHER PUBLICATIONS

Written Opinion of the International Searching Authority dated Aug. 20, 2009 in connection with International Patent Application No. PCT/CA2008/002284, 4 pages.

Office Action issued by the United States Patent and Trademark Office dated Jun. 1, 2010 in connection with U.S. Appl. No. 12/343,835, 32 pages.

Office Action issued by the United States Patent and Trademark Office dated Jan. 25, 2011 in connection with U.S. Appl. No. 12/343,835, 28 pages.

Office Action dated Dec. 3, 2012 in connection with U.S. Appl. No. 13/243,357, 30 pages.

Office Action dated Jul. 18, 2013 in connection with U.S. Appl. No. 13/243,357, 27 pages.

Final Office Action dated Jan. 2, 2014 in connection with U.S. Appl. No. 13/243,357, 30 pages.

* cited by examiner

| Community Entity IP | Communication Entity Type | User Name | User Password | Priority Level |
|---|---|---|---|---|
| 1.1.0.3 | Carrier VoIP Client | Jim | xxx | 5 |
| 1.1.0.3 | Carrier VoIP Client | Bob | xxy | 5 |
| 1.1.0.3 | Web Browsing | --- | --- | 3 |
| 1.1.0.3 | Unknown | Unknown | Unknown | 2 |
| 1.2.1.1 | Third-Party VoIP Client | --- | --- | 4 |

DIFFERENTIATED PRIORITY LEVEL COMMUNICATION

CROSS-REFERENCE TO RELATED APPLICATION

This application claims the benefit under 35 USC 120 of International Application No. PCT/CA2008/002284, entitled "Differentiated Priority Level Communication" filed in the Canadian Receiving Office on Dec. 23, 2008 and hereby incorporated by reference herein.

FIELD OF THE INVENTION

The present invention relates to the field of network communication and more particularly to the field of network communication with different priority levels for different types of data.

BACKGROUND

Packet-based networks such as the internet tend to employ best-effort forwarding strategies whereby packets travel through the network with no particular guarantees regarding travel time or jitter. In certain instances, however, network services require or would benefit from certain guarantees or preferential treatment and systems have been developed to provide higher priority for certain packets and to guarantee certain Quality of Service (QoS) standards for these packets. Providing improved quality of service for certain packets adds burden on network resources such that it is not usually possible to maintain the highest levels of QoS for every packet travelling through a network section. In this context it is necessary to limit the assignment of high-priority to only packets associated with critical services or services that require high QoS. Typically, high QoS services require special packet handling at the various network devices (e.g. routers) that packets travel through in the network. Most solutions for providing improved QoS for certain packets prescribe that the packets carry a priority level indicator to be used by the network devices to identify the priority level of the packet. Unfortunately, most sources of data packets (e.g. at the customer premise) cannot be trusted to assign their own priority level to packets, as it is in the best interest of each to declare a high priority. This makes it difficult for carriers to discriminate between those packets that should truly be entitled to improved QoS and those that should not.

In the context of the above, it can be appreciated that there is a need in the industry for an improved scheme for managing priority level assignment at the customer premise.

SUMMARY OF THE INVENTION

In accordance with a first broad aspect, the present invention provides a method comprising determining a particular hardware identifier associated with data received from a communication entity. The method further comprises determining a particular priority level associated with the data based on the particular hardware identifier. The method still further comprises prioritizing at least a portion of the data on a basis of the particular priority level.

In accordance with a second broad aspect, the present invention provides a network access component for use at a customer premise. The network access component comprises an interface adapted to receive data destined to be forwarded over a data network from a communication entity at the customer premise. The network access component further comprises a processing element. The processing element is operative for determining from the data a particular hardware identifier associated with the data. The processing element is further operative for determining a particular priority level for the data. The processing element is still further operative for prioritizing at least a portion of the data on a basis of the particular priority level.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which.

Figure 1:
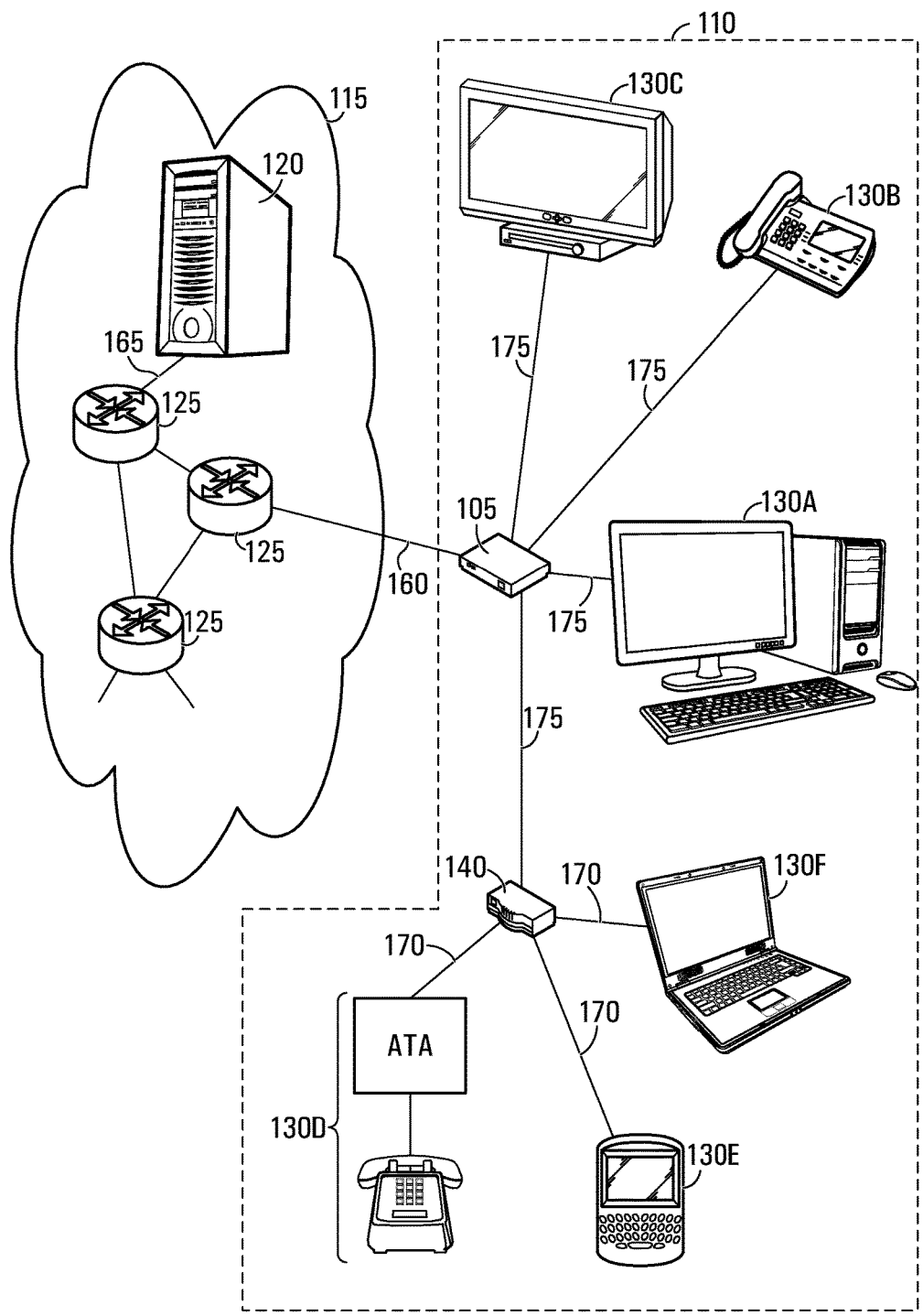
FIG. 1 shows a network architecture in accordance with a non-limiting embodiment.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a network architecture comprising a data network 115, a server 120 and customer premise equipment at a customer premise 110. At the customer premise 110, a plurality of customer devices 130A-F are in communication with a network access component 105 that provides and regulates access to the data network 115 for the entire customer premise 110. The customer devices 130A-F may be in direct communication with the network access component 105 through local links 175 or in indirect communication with the network access component 105 through a router 140. The network access component 105 connects to the data network 115 via a network link 160.

The data network 115 can be any network of data processing equipment and can include network equipment such as routers 125 interconnected in any particular arrangement and may include the server 120, as in the example shown. For illustrative purposes, the data network 115 will be considered to be a carrier-operated data network serving to provide connectivity to customer equipment at customer premises (including customer premise 110) and optionally to other networks. In the example provided here, the data network 115 is an IP network, in communication with other IP networks such as portions of the internet. As such, access to the data network 115 provided by the carrier can also provide access to the internet. The present invention is not intended to be limited by any particular type or definition of the data network 115 and indeed other definitions are possible including those that would include the customer premise 110 within the data network 115. Alternatively, the data network 115 could simply be the internet. It is to be understood that although the data network 115 will be exemplified here as a packet-based IP network, the data network 115 may be any data network supporting any type and format of data and could, for example, comprise circuit-switched portions and/or packet-switched portions.

The data network 115 supports differentiated service for data based on a certain priority level of the data. Any particular means of providing differentiated service may be employed in the data network 115 such as known QoS resource reservation control mechanisms; the invention is not intended to be limited by any particular means of providing differentiated service. The plurality of priority levels may, for example, each represent either certain rules according to which associated data should be treated (by network equipment), a certain delivery guarantee for the associated data, a certain priority to be given to the associated data (over other data), or any combination thereof. Any data being transmitted by the network access component 105 over the data network 115 can be assigned a particular priority level in a manner that will be described herein. In addition to the data network 115, the network access component 105 may process data internally based on the priority level. For example, the network access component 105 may feature different egress queues for various priority levels (the higher priority queues receiving preferential selection) and may have different processing rules for different priority levels. It is also to be understood that this invention is not limited to any particular number of priority levels. In the simplest case, there may be only two priority levels, a "regular-priority" level, and a "high-priority" level, where, for example, all regular-priority level data is treated with a best-effort approach and always takes second place to high-priority data. Alternatively, there may be many different levels of priority each of which may have complex rules, requirements or restrictions associated therewith.

In the example provided here, the carrier owns and operates the data network 115 to which it provides access; however, this should not be seen as necessary. In fact, the data network 115 might not belong to the carrier, but the carrier may, for example, rent a certain amount of resources from a foreign network operator or otherwise act as an intermediary between the foreign network operator and its customers. In the examples provided here, the carrier provides internet access (acting as an ISP) as well as other internet-based services including VoIP and IPTV. However, the carrier may provide only access to one such service or to other network services. The carrier may also merely allow or regulate access to a network operated by another entity. The carrier operates server 120, which, as will be described herein, allows the carrier to control the assignment of priority levels to data originating from the customer premise 110.

As shown in FIG. 1, many different customer devices at the customer premise 110 may communicate over the data network 115 via the network access component 105. In the example shown, a general-purpose computer 130A, a digital VoIP telephone 130B and an IPTV set 130C are connected directly to the network access component 105, while a VoIP phone system 130D (provided by the combination of a POTS-type phone with an analogue telephony adapter, ATA as is known in the art), a WiFi-enabled mobile phone 130E (a mobile phone that can engage in VoIP communication over a WiFi connection) and a laptop computer 130F are connected to the network access component 105 via the router 140. Thus, besides traditional internet use, many other connectivity services, including VoIP and IPTV services, rely on the network access provided by the network access component 105. Certain customer devices are connectivity service devises dedicated to a single type of connectivity service and therefore engage only in communication sessions related to this connectivity service such as, for example, the VoIP telephone 130B which serves uniquely for VoIP communication. Other customer devices, such as the computer 130A may have several software entities or applications running on them, each of which may engage in a communication session associated with a different type of connectivity service. For example, the computer 130A may implement a VoIP client and a traditional web browser. Each entity, whether software and/or hardware, that engages in a communication session over the data network 115 via the network access component 105 will be considered herein to be a "communication entity". In the present example, local links 175 are Ethernet connections although any other suitable type of connection may be used, including for example USB, WiFi (e.g. 802.11g), IEE 1394, SCSI or PCI connections. In this example, connections 170s between customer devices 130D-F and the router 140 are 802.11g connections, but it will be appreciated that other types of connections may be used as well.

The network link 160 linking the network access component 105 to the data network 115 can be implemented over any suitable connection medium and may comprise physical cabling (e.g. electrical or optical) or a wireless connection to network equipment within the data network 115. In the example provided here, the network link 160 is a DSL connection over telephony wires which may also be used for POTS-type telephony. Of course, the network link 160 could also be implemented, for example, over a coaxial cable of the type used to provide internet access over a cable TV distribution system. In the example provided, the network link 160 is associated with a network access account which, in turn, is associated with a customer. The customer can be, for example, an individual that purchases or subscribes to network access from the carrier or a business.

At the customer premise 110, a network access component 105 regulates access to the data network 115. The network access component 105 is shown here as a stand-alone broadband modem, however the network access component 105 can be any entity regulating, enabling or providing access to the data network 115. The network access component 105 does not necessarily need to be physically separated from all other items shown at the customer premise 110 and could be, for example, integral with a computer or VoIP phone at the customer premise 110.

Figure 3:
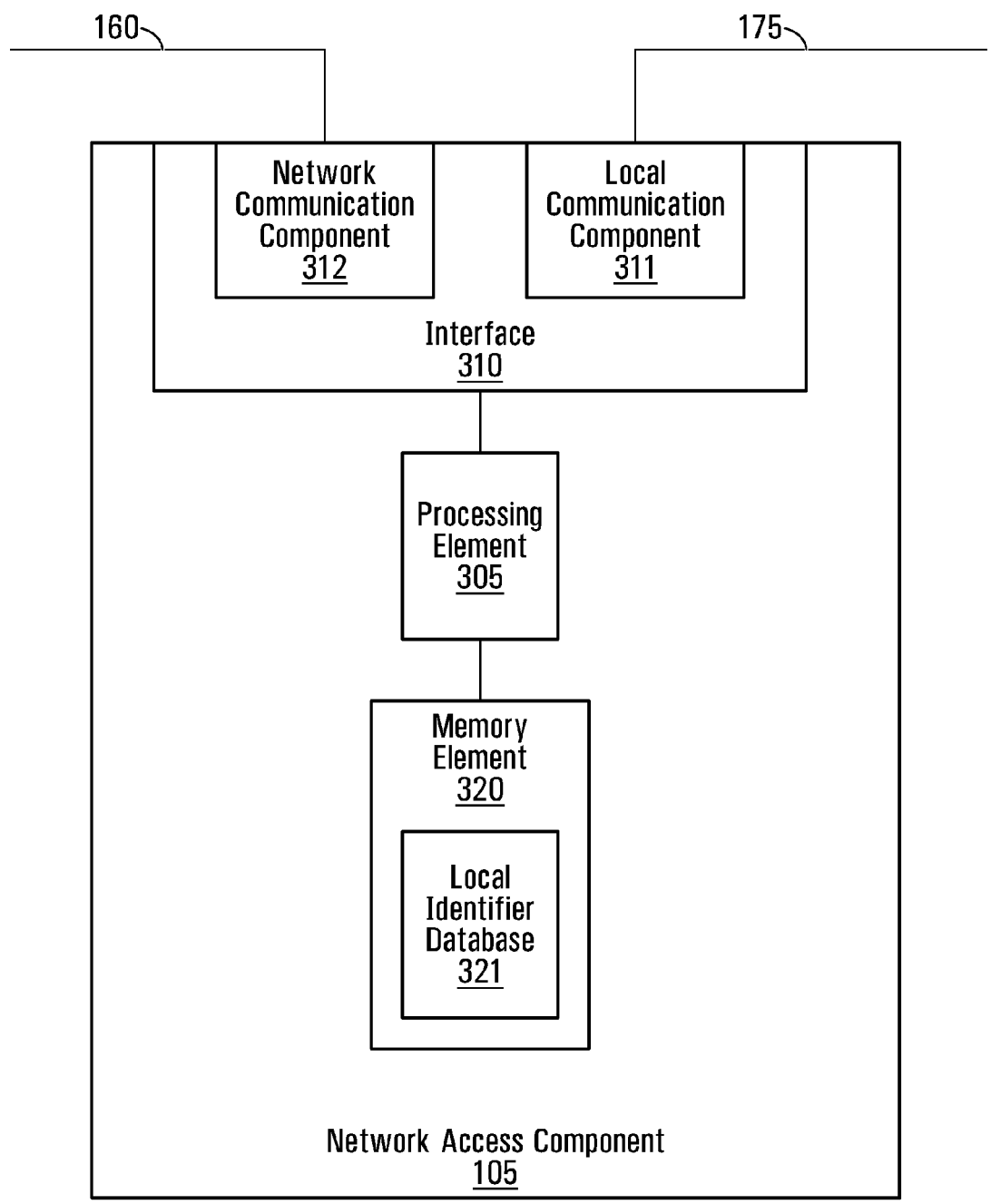
FIG. 3 shows a block diagram of a network access component in accordance with a non-limiting embodiment.

As shown in FIG. 3, the network access component 105 comprises a processing element 305, an interface 310 and a memory element 320. The interface 310 allows communication between the network access component 105 and the data network 115 as well as between the network access component 105 and the various customer devices 130A-F. In the example shown, the interface 310 comprises a local communication component 311 for communication over the local links 175 (only one shown in FIG. 3) with the customer devices 130A-F and a network communication component 312 for communication over the network link 160 with the data network 115.

The local communication component 311 receives data from a connected customer device and sends it for processing to the processing element 305. The local communication component 311 may comprise physical elements and in this example, it comprises hardware for receiving RJ45/8P8C connectors.

The network communication component 312 is adapted for exchanging data with the data network 115 over network link 160. The network communication component 312 receives data for forwarding over the data network 115 and sends it, suitably formatted, over the data network 115. The network communication component 312 also receives data packets from the data network 115 for processing by the processing element 305 and/or transmitting to a customer device. The network communication component 312 can serve a plurality of functions and in the non-limiting example shown, it permits communication with the server 120, which is accessible through the data network 115. The network communication component 312 can be suited for communicating with the server using established protocols.

The processing element 305 is in communication with the interface 310 for processing data received at the interface 310. In the example shown here, the processing element 305 is a dedicated processing unit, although it is to be understood that the processing element 305 could be any suitable processing entity. For example, the processing element 305 could be implemented by the processing intelligence of a general- or multi-purpose computer or may be distributed over multiple processing units. The invention is not intended to be limited to a particular form for the processing element 305 and one skilled in the art will appreciate that many different arrangements could provide the functionality of the processing element 305 as described herein.

The memory element 320 is in communication with the processing element 305. In this example, the memory element 320 is physically separated from the processing element and communicates (e.g., over a bus), with the processing element 305. Alternatively, the memory element 320 could be integral with the processing element 305. The memory element 320 may be dedicated to a single purpose or may be multi-purposed, and in a non-limiting example, it holds a list or local identifier database 321 of "identifiers" and associated respective "priority levels", as will be described below.

Specifically, the processing element 305 processes data received at the interface 310 in accordance with a "priority level" associated with the data. The priority level associated with the data is actually associated with an "identifier" that is received along with the data. In certain cases, all data originated by a particular communication entity (e.g. a particular VoIP phone or VoIP software client) has a common priority level and accordingly, a single identifier may be associated with all data originated by this communication entity. This identifier may be unique to the particular communication entity or shared among communication entities at a same priority level. Alternatively, individual communication sessions engaged in by a communication entity may each be assigned different priority levels, in which case data specific to a certain communication session may have a different identifier than data specific to a certain other communication session. The communication sessions may each have unique identifiers, or a common identifier may be shared among communication sessions at a same priority level (either within the originating communication entity or globally for the customer premise 110 or data network 115). It will be appreciated that even single instances of transmission such as single packets may have individual priority levels and associated identifiers. Furthermore, in each of the above examples, identifiers may be persistent or time-varying.

Figures 6, 7:
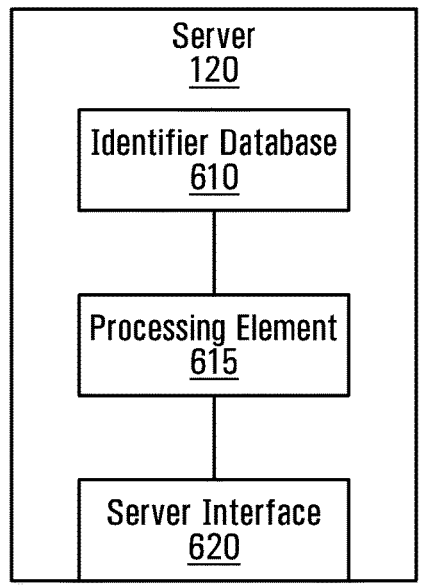
FIG. 6 shows a block diagram of the server shown in FIG. 2 in accordance with a non-limiting embodiment.
FIG. 7 shows an exemplary identifier database in accordance with a non-limiting embodiment.

The server 120 maintains an association between identifiers and priority levels and provides it to the network access component 105, as will be further described below. Specifically the server 120 is in a communicative relationship with the network access component 105 and can be any network-accessible computing equipment. An exemplary embodiment of the server 120 is shown in FIG. 6. In this example, server 120 comprises a processing element 615, an identifier database 610 and a server interface 620. The server interface 620 is adapted for exchanging data with the data network 115 and is used to communicate with the network access component 105. A link 165 connects the server 120 to the data network 115 and can be implemented over any suitable connection medium, including physical cabling (e.g. electrical or optical) or a wireless connection to network equipment within the data network 115. The server interface 620 receives data from the processing element 615 and transmits it, suitably formatted, over the data network 115. Also, the server interface 620 receives data packets from the data network 115 for processing by the processing element 615. The server interface 620 can be suited for communicating with the network access component 105 using established protocols.

The processing element 615 is in a communicative arrangement with the server interface 620 and has access to an identifier database 610, which is shown here as being within server 120, but could be external as well (e.g. accessed through the server interface 620). Although it is shown here as a single entity, one skilled in the art will readily appreciate that the functionality of the server 120 as described herein could be spread among multiple physical devices. The server 120 is shown here as being within the data network 115, however the server 120 could be located outside of the data network 115. In such a case, communication between the server 120 and the network access component 105 may be partially supported by data network 115 (if, for example, the server 120 is part of another data network connected to the data network 115), or may be entirely implemented outside of the data network 115 (e.g. via a direct link to the network access component 105).

As will be described below, the server 120 serves as a trusted source of information to the network access component 105. To this end, a mechanism is provided to establish a trust relationship between the network access component 105 and the server 120. Any particular mechanism may be used, the invention not being limited to one such mechanism. In one specific example, the IP address (or other location identifier) of the server 120 can be hard-wired into the network access component 105 or coded into software or firmware running on the network access component 105.

Thus the network access component 105 can communicate with that particular IP address knowing that it is communicating with the server 120. Alternatively, the network access component 105 may obtain the IP address of the server 120 from another known server, such as an authentication server that allows access to the data network 115 (alternatively still, the known authentication server itself may serve as the server 120). In another embodiment, the server 120 knows the IP address (or other location identifier) for the network access component 105 and initiates communication with the network access component 105. An authentication sequence is initiated in order for the network access component 105 to determine that the server 120 is indeed the trusted source. The authentication sequence may be any suitable exchange between the server 120, the network access component 105, and optionally other trusted entities and in one example of authentication sequence, the server provides the network access component 105 with confidential information that is only known to the network access component 105 and the server 120. In yet another embodiment, neither the server 120 nor the network access component 105 know the network location of one another, but they discover each other using known network searching methods and establish a trust relationship using an authentication sequence that confirms their respective identities to one another. Encryption and/or digital certificates in a known manner in communications between the server 120 and the network access component 105 may be used to provide added security and prevent impostor entities from impersonating the server 120. Encryption and/or digital certificates may also be used to prevent unauthorized network access components from gaining access to the server 120.

To illustrate certain aspects of the invention, a specific exemplary embodiment will now be described with reference to the figures.

Figure 2:
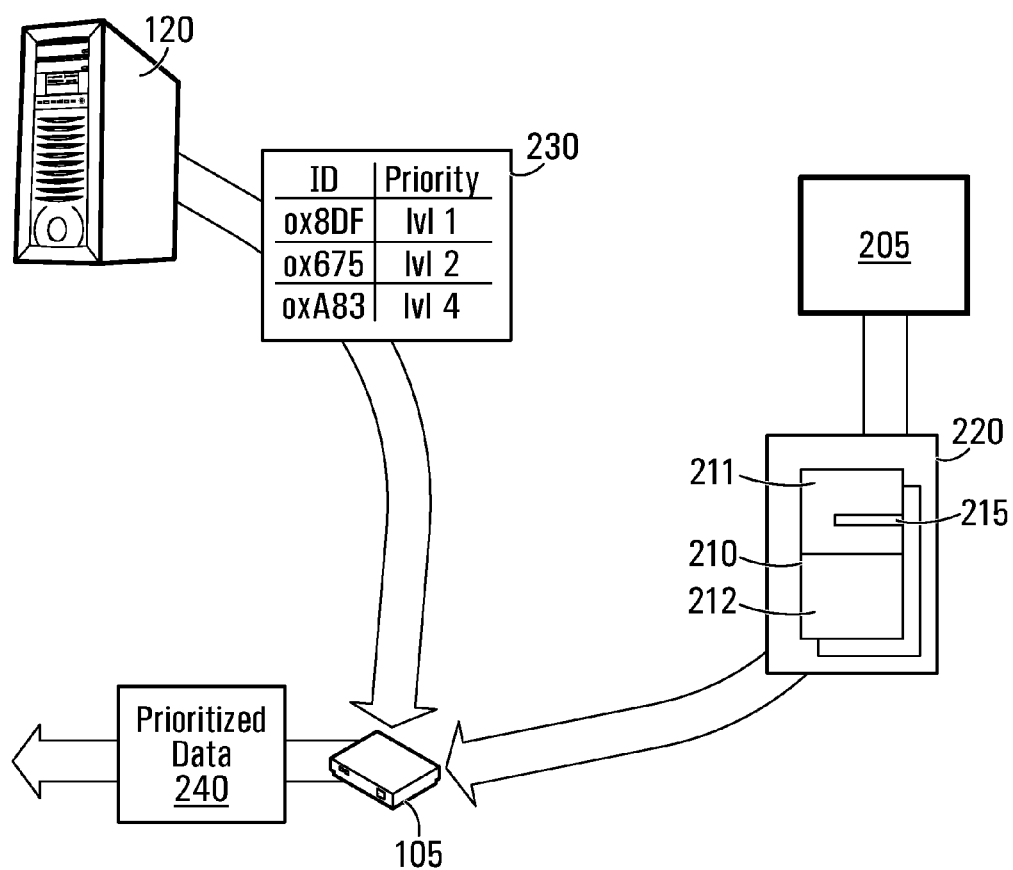
FIG. 2 shows an intercommunicative arrangement of components in the architecture of FIG. 1, including a server, a network access component and a general-purpose computer in accordance with a first exemplary embodiment.

FIG. 2 illustrates prioritization of communications in accordance with a non-limiting example. A communication entity 205 engages in a network communication session with another entity over the data network 115. The communication entity 205 sends data 220 along with an identifier 215 to the network access component 105. As will be discussed below, in this example the identifier 215 was previously received at the communication entity 205 from the server 120, however this may not be the case in other embodiments. The network access component 105 receives priority information 230 from the server 120 and based on the priority information 230 and the identifier 215 received with data 220, it prioritizes at least a portion of the data 220 and transmits prioritized data 240 over the data network 115.

The invention is not intended to be limited to any particular format for the data 220 but in this particular example, the data 220 is IP packet data and includes a packet 210 having a header 211 and a payload 212. The header 211 comprises information regarding the payload 212, the destination of the packet 210 and the communication entity from which it originates. In this example, the header 211 also comprises the identifier 215. However, this particular arrangement is exemplary only, and the identifier 215 does not need to be provided in the header 211 of the packet 210 but needs only be generally provided to the network access component 105 by the communication entity 205 with the data 220. The data 220 may include connectivity service data, such as VoIP data or IPTV data, which may be comprised within the payload 212 of the packet 210.

Figure 4:
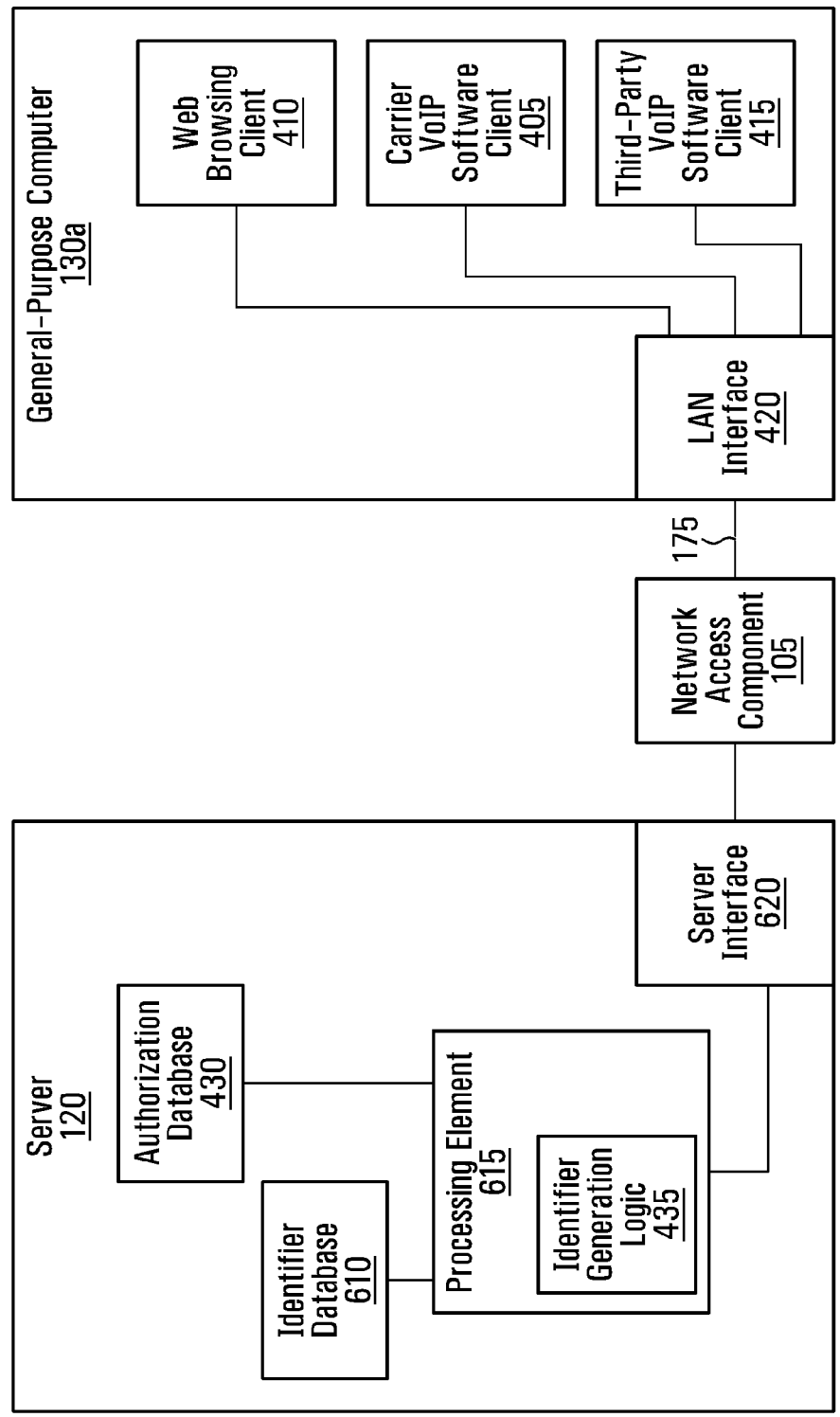
FIG. 4 shows a block diagram of the server, the network access component and the general-purpose computer shown in FIG. 2 in accordance with the first exemplary embodiment.

In this example, the communication entity 205 is a carrier VoIP software client 405 running on the general-purpose computer 130A. The general-purpose computer 130A is depicted in FIG. 4 in a highly simplified diagram showing only certain components relevant to the present example. The general-purpose computer 130A is running several software modules including a web browsing client 410, a third-party VoIP software client 415 using the network access provided by the network access component 105 to implement VoIP services offered by a business entity other than the carrier, and the carrier VoIP software client 405 implementing VoIP services offered by the carrier.

The general-purpose computer 130A also comprises an interface for communicating with the network access component 105 over local link 175. In the example shown, the local link 175 is an Ethernet connection and the interface is a LAN interface 420. The LAN interface 420 is in communication with the carrier VoIP software client 405, the web browsing client 410 and the third-party VoIP software client 415, each of which communicates over the data network 115 via the LAN interface 420 and the network access component 105. It is to be understood that the interface can be any interface permitting communication with the network access component 105 and could take many forms other than the LAN interface 420.

Figure 5A:
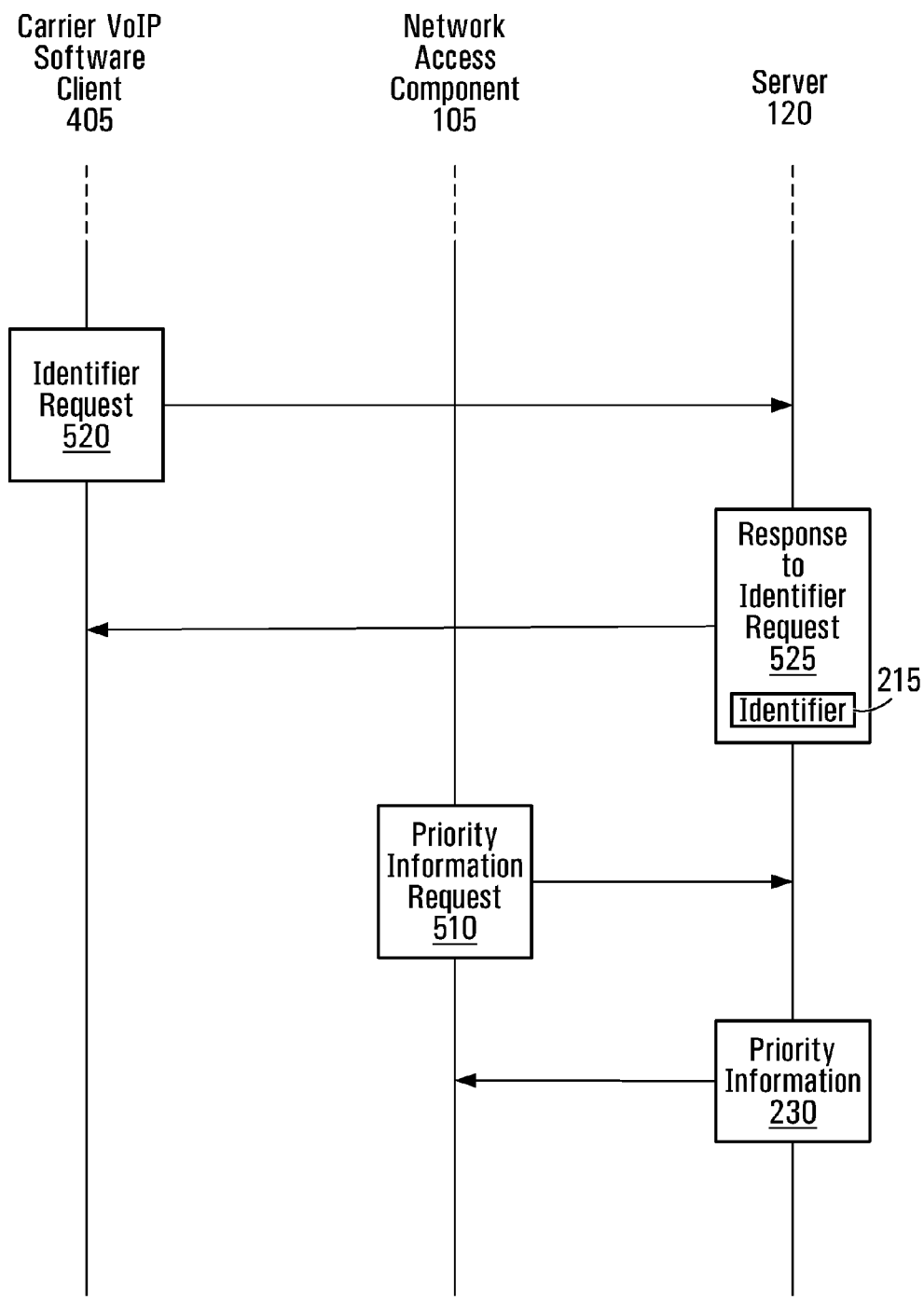
FIG. 5A shows a message flow diagram among the general-purpose computer, the network access component and the server shown in FIG. 2 in accordance with a first aspect of the first exemplary embodiment.
Figure 5B:
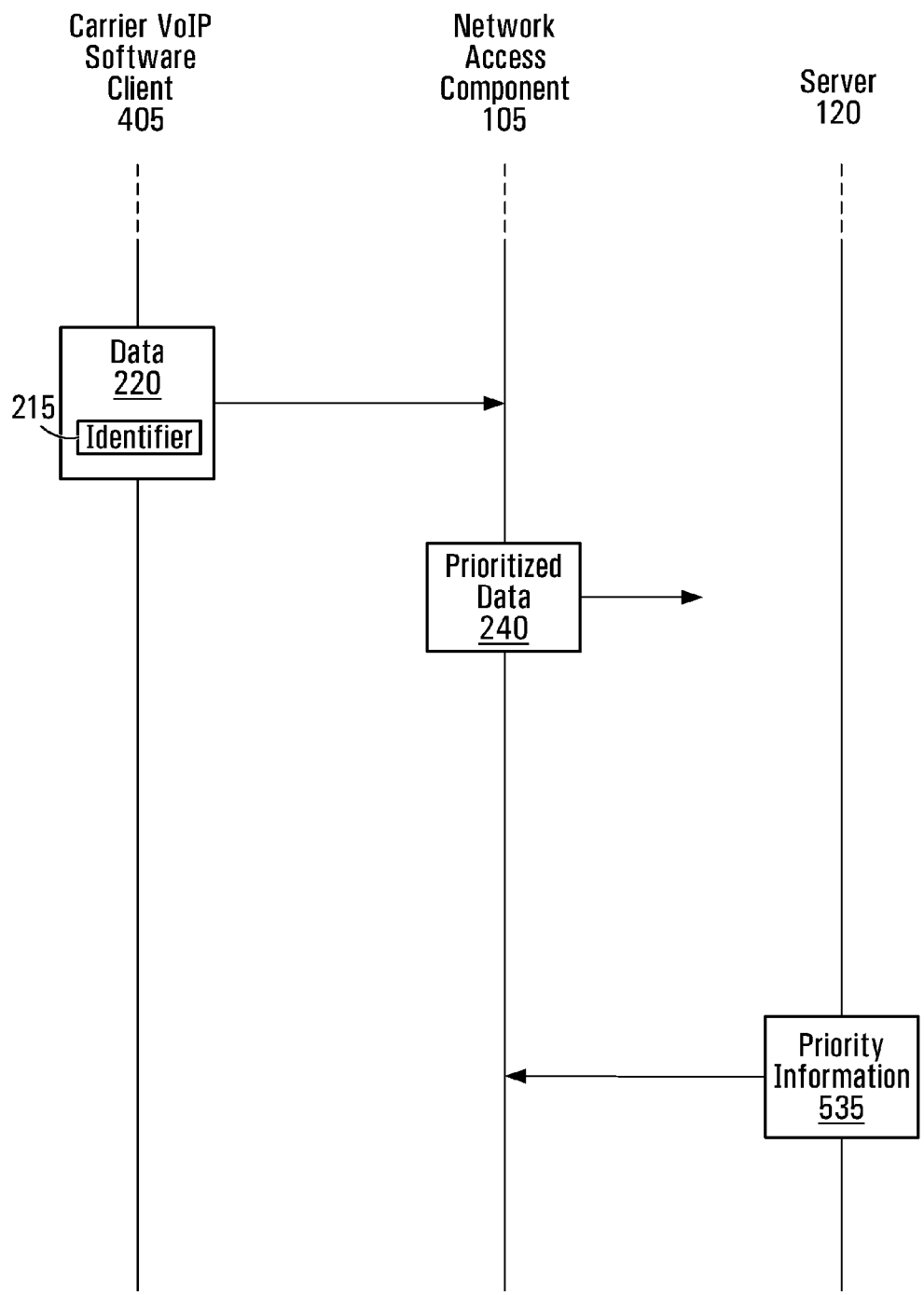
FIG. 5B shows another message flow diagram among the general-purpose computer, the network access component and the server shown in FIG. 2 in accordance with another aspect of the first exemplary embodiment.

FIGS. 5A and 5B illustrate an exemplary flow of events corresponding to the particular first example being presently described. The carrier VoIP software client 405 is provided either directly by the carrier operating the server 120 or under agreement therewith (or is otherwise recognized by the carrier), and is programmed to communicate with the server 120 and receive therefrom an identifier associated with a given priority level (i.e a priority level assigned to the service supported by the VoIP software client 405). To this effect, the carrier VoIP software client 405 may communicate through the network access component 105 using the LAN interface 420 in a known manner. As will be described in more detail below, the communication between the carrier VoIP software client 405 and the server 120 may include an authentication sequence allowing the server 120 to confirm that it is indeed communicating with the carrier VoIP software client 405 before providing any identifier. The third-party VoIP software client 415, in contrast, is not programmed to receive an identifier from the server 120 and therefore does not know to communicate with the server 120 (nor could it pass the authentication sequence if it was programmed—or modified—to communicate with the server 120) and therefore does not receive therefrom an identifier associated with a given priority level.

With reference to FIG. 5A, in this example, when the carrier VoIP software client 405 is initiated (e.g., by a user—not shown—at general-purpose computer 130A) it polls the server 120 to determine if there is any particular identifier it should be using in communications with the network access component 105. In this example, the carrier VoIP software client 405 sends an identifier request 520, in this case as a packet communication via the network access component 105. The identifier request 520 may include information about (i) the customer associated with network link 160 (e.g., a network access account number), (ii) the carrier VoIP software client 405 itself (e.g. a communication entity ID), (iii) the user at the general-purpose computer 130A (e.g. user ID and password), and/or (iv) a destination with which communication is to be established by the carrier VoIP software client 405. In the present example, the identifier request 520 includes information identifying the particular carrier VoIP software client 405, the user name and password of a user at the general-purpose computer 130A, and information identifying the particular customer associated with the network link 160. The information included in the identifier request 520 can be used in the authentication sequence referred to above. It should be understood that any known model of authentication sequence could take place between the server 120 and the carrier VoIP software client 405. Optionally, information indicative of a desired priority level may also be communicated in the identifier request 520, the server 120 being operative to decide whether or not to grant the desired priority level, and in the negative to select another priority level. The identifier request 520 described herein is exemplary only and could alternatively lack any of its contents described above or may include any additional information. In a simple alternate example, the identifier request 520 is merely a message requesting an identifier. Furthermore, although the identifier request is sent upon initiation or start-up of the carrier VoIP software client 405 in this example, it may be sent upon other triggering events such as upon the initiation of a communication session.

By sending the identifier request 520, the carrier VoIP software client 405 is requesting a priority level for the data it will subsequently send via the network access component 105. In the non-limiting example provided here, the carrier VoIP software client 405 and the server 120 are configured to arrange for a single priority level for all VoIP calls made using the carrier VoIP software client 405. Thus, when the carrier VoIP software client 405 sends an identifier request 520, it expects a single identifier in response, which will correspond to a priority level applicable to all outgoing VoIP data. Alternatively, however, many identifier requests could be sent by any one communication entity, each requesting an identifier corresponding to a respective communication session or, in some cases, instance of transmission. For example, a VoIP client could request a different identifier for each VoIP call initiated at the onset of each VoIP call. As mentioned above, information in this case held in the identifier request 520 may include information about the communication or session (e.g. call origin/destination) for which the identifier is requested.

Upon receiving the identifier request 520, the server 120 determines which, if any, identifier is to be supplied to the carrier VoIP software client 405. There are many possible bases for the determination of whether an identifier is to be supplied. In this example, the processing element 615 of the server 120 analyses the information contained in the identifier request 520 and validates it against an authorization database 430 (depicted in FIG. 4), which in this example is a locally stored database (but could alternatively be remote) containing valid usernames and passwords for each customer account. The server 120 also determines what kind of communication entity generated the identifier request 520 and in this case finds that the source of the request 520 is a carrier VoIP software client. Based on this, the server 120 determines an appropriate priority level and supplies the identifier 215 associated with that priority level to the carrier VoIP software client 405. Additionally, the server 120 may take into account other considerations external to the particular communication entity, customer or session, when determining the appropriate priority level to assign such as current network load, resource availability, time of day and past behavior at the customer premise 110 (e.g., typical duration of VoIP calls, amount of high-priority network utilization, etc . . . ).

The authorization database 430 contains the information necessary for validating the incoming identifier request 520. An example of an authorization database 430 is shown in FIG. 7. Here the authorization database 430 comprises customer identifiers (in a non-limiting example where each customer has a unique IP address, the IP address is used in the list as customer account identifier, however any other customer identifier could be used), a communication entity identifier defining what kind of communication entity has issued the request, a user ID, a corresponding password and a priority level. Wildcards 710 may be present in the database in case certain information is not needed to determine priority level. The authorization database 430 shown here is purely exemplary and one will appreciate that the contents of such an optional database can widely vary depending on the basis on which the server 120 is to determine whether to supply an identifier, and if so which identifier to supply. For example, in the case where carrier VoIP software client 405 expects a different identifier for different sessions, session information could be included in the authorization database 430.

Once the processing element 615 has consulted the authorization database 430 and identified a particular priority level, the processing element 615 looks up the particular priority level in the identifier database 610 and determines the identifier 215 associated with the priority level. The identifier database 610 stores an association between at least one identifier (including the identifier 215) and a respective priority level. In the present example, the identifier database 610 stores a list of identifiers (including the identifier 215) and their respective priority levels. However, depending on the particular embodiment of the invention, the identifier database 610 can vary in form and content. While, the server 120 here holds one single identifier for each priority level in the identifier database 610, it is to be understood that there may be multiple identifiers for a single priority level and some priority levels might not have a corresponding identifier. In particular, there may be no identifier associated with the lowest possible (or default) priority level. In such a case, when the server 120 receives an identifier request and determines that the appropriate priority level for the requesting communication entity is the lowest (or default), the server 120 may simply not respond, or respond that no identifier is available. One will appreciate that the data network 115 may, in certain cases, support only two priority levels, in which case a single identifier might be used to designate all high priority level data, while the low priority level has no identifier. For the purposes of illustration, a plurality of possible identifiers will be assumed.

The identifiers stored in the identifier database 610 are carrier-specific identifiers meaning that control and distribution of the identifiers used lies with the carrier. The carrier-specific identifiers may be generated at any particular location and provided to the server 120 in any suitable manner. In a non-limiting example, the carrier-specific identifiers are generated by a remote computer and sent to the server 120, possibly in an encrypted communication, over the data network 115. In the particular example shown here, however, the carrier-specific identifiers are generated at the server 120 by an identifier generation logic 435, which, although shown in FIG. 4 as being within processing element 615, could be a separate entity. In this example, the carrier-specific identifiers are time-varying; the identifier associated with each priority level is deliberately changed periodically and replaced with a new identifier. The carrier-specific identifier can be changed, for example, once a day although the period could be smaller or larger. As explained above, the carrier-specific identifiers could also be static, or semi-permanent (e.g. be changed only when carrier staff determines that the need to do so has arisen). Also, generation of the carrier-specific identifiers may be triggered by other events. In an alternate embodiment, the identifier generation logic 435 may generate a new identifier for each identifier request (such as identifier request 520) which it then stores in the identifier database 610.

Certain decisions made at the server 120 may be based on whether a particular communication entity is "expected" to communicate via the network access component 105. A communication entity may be expected to communicate the network access component 105 for any of a plurality of reasons. In the present example, the identifier request 520 comprises enough information for the server 120 to identify the carrier VoIP software client 405 from which it originates and the network access component 105 through which it is sent. Based on this, the processing element 615 of the server 120 identifies the expectation that the carrier VoIP software client 405 will communicate via the network access component 105. A separate database (not shown) may store an association between the network access component 105 and at least one communication entity expected to be communicating through it. Alternatively, another database may store this association; for example, the authorization database 430 may include an entry for every communication entity at the customer premise 110 and an identification of the network access component 105 associated with each entry. In another embodiment, the network access component 105 may itself provide the server 120 with an identification of every communication entity to which it is connected. Alternatively still, another entity, such as a network management server may keep track of the communication entities expected to communicate via the network access component 105 and provides a list of these to the server 120.

The processing element 615 can generate responses to identifier requests. In this example, once the identifier 215 determined, the processing element 615 generates a response to identifier request 525. Referring back to FIG. 5A, the response to identifier request 525 communicates the identifier 215 to the carrier VoIP software client 405. The response to identifier request 525 is a communication between the server 120 and the carrier VoIP software client 405 and may be transmitted via the network access component 105. Had the sever 120 not determined an identifier (e.g. because there is no identifier for the determined priority level, or because the authentication sequence failed), the response to identifier request 525 may have indicated a "default" identifier, or may have been indicated that no identifier applies, or the response to identifier request 525 may simply not have been sent at all.

The communication entity 205, in this case carrier VoIP software client 405, receives the response to identifier request 525 and stores the identifier 215 contained therein for use in communications to be carried out via the network access component 105.

As mentioned above, the server 120 acts as a trusted source of information for the network access component 105. The network access component 105 is programmed or hard-wired to request priority information from the server 120. The priority information received from the server 120 will instruct the network access component 105 as to how to prioritize various data received from the communication entities 103a-f.

In order to receive priority information from the server 120, the network access component 105 sends a priority information request 510. The priority information request 510 is a message indicating to the server 120 that the network access component 105 wants to receive up-to-date priority information. It may include information on the network access component 105 itself (e.g. hardware type information, software version, etc . . . ), on the customer premise 110 or customer and on the communication entity(ies) communicating via the network access component 105. The priority information request 510 may also include information defining a motivation for the request or an indication of a particular priority information sought. For example, if the network access component 105 receives data from a communication entity with an identifier that is not recognized, the network access component 105 may send the server 120 a priority information request 510 specifically for the unknown identifier. By so doing, the network access component 105 may also be informing the server 120 that the communication entity associated with the unknown identifier (which, however, might not be unknown to the server 120) is expected to communicate through this particular network access component 105. Alternatively still, the priority information request 510 may be a simple or empty message, the sending of which alone indicates the need for priority information. In the present example, however, the priority information request 510 comprises an identifier of the customer premise 110, such as an IP address.

In the present example, the network access component 105 sends the priority information request 510 periodically, but it should be noted that the network access component 105 can be configured to send the server 120 the priority information request 510 at any suitable occasion. For example, a priority information request may be sent automatically upon initialization, which in this example is the booting up of the network access component 105. Thus, with reference to FIG. 5A, the priority information request 510 may precede the identifier request 520. It will also be appreciated that the network access component 105 could also send a priority information request upon receipt of data from a communication entity with an unrecognized identifier.

Communications between the server 120 and the network access component 105 can take on any suitable format. In the example shown here, the server 120 is within the data network 115 and can communicate with the network access component 105 using established protocols, such as the TR-069 protocol; however, other communication schemes can be used.

Upon receiving the priority information request 510, the server 120 may perform some verifications based on information contained in the priority information request 510, to determine whether the network access component 105 that has sent the priority request 510 is authorized to receive the priority information 230. To this end, an additional network access component authorization database (not shown) may be provided. In other embodiments, the server 120 may perform verifications based on information contained in the priority information request 510 to determine which priority information to send to the network access component 105. To this end, additional databases may be provided in the server 120. In the present example, however, the server 120 accepts the priority information request 510 without additional verification.

The processing element 615 of the server 120 prepares the priority information 230 to send to the network access component 105 based on information contained in the identifier database 610. As shown in FIG. 2, in the present example the priority information 230 is a list of all the identifiers (including the identifier 215) and their corresponding priority level, however the priority information 230 could take a number of different formats. For example, the priority information 230 could contain only a subset of all the identifiers or only information specifically requested in the priority information request 510, such as the priority level associated with a particular identifier that was sent in the priority information request 510. Alternatively, in an embodiment where there are multiple identifiers for each priority level, the processing element 615 could obtain from the identifier database 610, only those identifiers corresponding to communication entities expected to be communicating through the network access component 105 that has sent the priority information request 510.

In the example shown here, the priority information 230 is sent in response to the priority information request 510. However, priority information may be sent under different circumstances as well. For example, priority information may be sent to the network access component 105 upon generation, by the identifier generation logic 435, of a new identifier (e.g. in the case where the identifier generation logic 435 generates a new identifier at every instance of an identifier request). Optionally in this case, the processing element 615 of the server 120 may only send priority information to the network access component 105 if it determines that the newly-generated identifier relates to a communication entity that is expected to communicate via the network access component 105. Other instances of changes in the identifier database 610, for example if the identifiers are periodically replaced with new ones, may trigger a conveyance of priority information to the network access component 105 to provide it with updated priority information reflective of the changes in the identifier database 610. Alternatively still, priority information may be sent to the network access component 105 at periodical intervals. Priority information 535 shown in FIG. 5B is an example of such periodic transmission; it is transmitted without a priority information request simply because a certain period of time has elapsed since, for example, the last transmission of priority information to the network access component 105.

The network access component 105, having received the priority information 230, prioritizes the data 220 received from the carrier VoIP software client 405 on the basis of the priority information 230 and the identifier 215 received with the data 220. The exact steps undertaken by the network access component 105 depend on the particular embodiment of the invention. In the present example, the network access component 105 has received a set of identifiers and respective priority levels and stores this information as the list 321 in the memory element 320.

It is recalled that when a communication entity such as the carrier VoIP software client 405 wants to send data over the data network 115, it sends to the network access component 105 the data 220 with the identifier 215 that it has previously received from the server 120. This is also shown in FIG. 5B. As mentioned previously, the data 220 and the identifier 215 can be sent by any suitable method and in any suitable format. Here, however, the identifier 215 is placed in an unused field of the header 211 of the packet 210 (here, an IP packet). The packet 210 carries VoIP data in the payload 212. This represents a layer 3 approach to transmitting the identifier 215 to the network access component 105. One possible location for the identifier 215 in the header 211 is the "option" field defined in IETF RFC 791. Alternatively, a layer 5 approach could be employed whereby the optional extension header field defined in IETF RFC 1889—RTP is used to carry the identifier 215. Alternatively still, a special header (containing the identifier 215) could be inserted into SIP messages as permitted by IETF RFC 3261, which would be ignored by devices that do not understand the meaning of the header. Thus the identifier 215 could be carried in SIP signaling messages.

The data 220 could span over multiple packets or in otherwise organized discrete components. While the identifier 215 may be included in every packet used to convey the data 220, this is not a necessary condition. If the data 220 is to be received by the network access component 105 in multiple discrete increments or packets (e.g., with other data from other communication entities arriving between increments) and the identifier is only included in an early packet such as packet 210, the network access component 105 may use other identifying methods to determine the source of incoming packets and thereby determine whether the identifier 215 received with any earlier packet is associated with the later-received data. Identifying methods may include assessing the MAC address of the source, identifying another communication entity ID in the packet, or performing deep packet inspection to find other identifying information. Thus the identifier 215 may be only sent once (e.g., or once per session, once upon initialization of the sending communication entity, periodically, etc . . . ) or with every data packet.

The network access component 105 receives the data 220 with the identifier 215 therein and determines the identifier 215. In the present example, the network access component 105 finds the appropriate field in the header 211 and extracts the identifier 215. The network access component 105 then determines whether the identifier 215 is among the identifier(s) identified in the priority information 230 received from the server 120. It is recalled that, in the present example, the various identifier(s) (which could be all the identifiers in the identifier database 610 and their respective priority levels, or only those expected to be received by the network access component 105) will be stored, along with respective priority levels, in the local identifier database 321 held in the memory element 320. The network access component 105 attempts to find the identifier 215 in its local identifier database 321. If it is found, the network access component 105 determines the priority level associated with the identifier 215.

Once a given priority level associated with the identifier 215 received with the data 220 is determined from the data 220 received from the communication entity 205, the data 220 (or at least a portion thereof) is prioritized accordingly. Prioritizing the data 220 can involve special processing of the data 220 by the processing element 305 or any other operation that will affect the manner in which the data 220 is conveyed to its destination. For example, the processing element 305 may treat the data 220 with an urgency that depends upon the given priority level, for example by placing the data 220 in a particular queue that is "popped" with a frequency corresponding to the given priority level (alternatively, the data 220 could also be placed in a position in a queue proportional to the given priority level such that it exits the queue ahead of other data).

Prioritizing the data 220 can also involve its modification by the network access component 105. In a non-limiting example, certain fields of the data 220 may be modified to signal certain QoS requirements to network equipment in the data network 115. For example, if DiffServ values (or similar indicators) are used in the data network 115 to provide differentiated service, the network access component 105 may choose to set the DiffServ value contained in the header 211 of the received packet 210 to a value indicative of the differentiated service (i.e. priority level) required for the data 220. This can be done by simply adding (or overwriting) a DiffServ value (or similar indicator) to the data 220 (e.g. in the header 211 of the packet 210). Alternatively, a sufficiently high priority level associated with the identifier 215 or other condition may indicate that the communication entity 205 which has originated the data 220 (in this case, the carrier VoIP software client 405) can be "trusted" to set the DiffServ value (or similar indicator) for the data 220 (i.e. the DiffServ value received with the data 220 is to be trusted). For example, the network access component 105 may selectively accept the DiffServ value (or similar indicator) and forwards the data 220 with the DiffServ value (or similar indicator) unchanged if the priority level of the data 220 is sufficiently high (e.g. above a certain threshold). Otherwise, the network access component 105 can delete the DiffServ value (or similar indicator) or overwrite it with a default DiffServ value (or similar indicator) or a DiffServ value (or similar indicator) selected based on the priority level of the data 220. In this manner, the network access component 105 can serve as a gateway to a data network 115 where DiffServ values (or similar QoS indicators) can be trusted, addressing the problem of untrustworthy communication entities illegitimately availing themselves of high-priority service. Advantageously, the network access component 105 may protect the data network 115 from inappropriate use of its differentiated services by ensuring that the DiffServ value (or similar QoS indicator) of all data flowing into the data network 115 via the network access component 105 is accorded a DiffServ value received from or approved by a trusted source, such as the server 120.

The prioritized data 240 is forwarded by the network access component 105 over the data network 115 in any suitable manner or format as determined by the particular communication arrangement and technology used. Prioritizing the data 220 can dictate a special forwarding scheme, such as forwarding the data 220 in a particular way or format or even over a particular network link, in an embodiment where multiple such links are present (e.g. all associated with the same customer).

While in this exemplary embodiment each priority level had a single identifier associated therewith, in an alternate embodiment, there may be many different identifiers that are associated with any one priority level. For example, if the data network 115 is connected to many different customer premises, there may be a set of identifiers associated with each priority level for each customer premise. Alternatively, the identifier(s) used by each communication entity may be unique. In such cases, the identification database 610 may include, for each priority level, an entry for each identifier associated therewith. Additional information may be included to class these entries, such as by an identification of the customer premise for which each entry applies (e.g. an IP address, if each customer premise has its own unique IP address). The authorization database entries may also include, in this case, identifiers associated with each priority level, thus making it unnecessary to consult the identifier database 610. If this is the case, the authorization database 430 can be regarded as an identifier database regardless of whether a separate database exists. Any manner of combining the information of the authorization database 430 and the identifier database 610 may be used to replace the two databases with a single one performing the functions of both.

Figure 8:
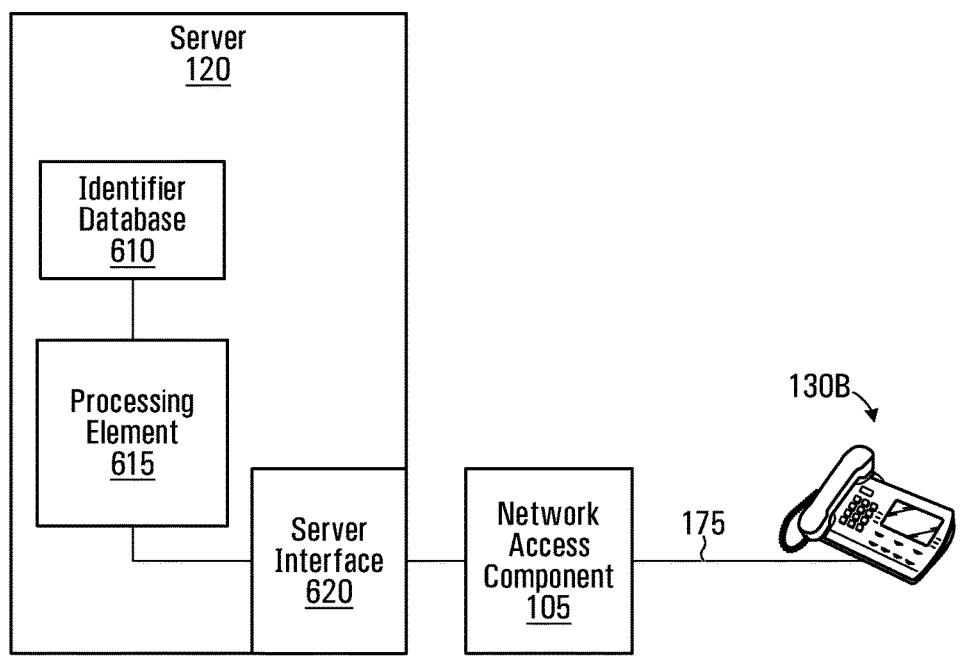
FIG. 8 shows a block diagram of the server, the network access component and a VoIP telephone shown in FIG. 2 in intercommunicative arrangement in accordance with a second exemplary embodiment.

A second non-limiting exemplary embodiment will now be described with reference to FIGS. 8 and 9. The second exemplary embodiment comprises many elements described in detail in the discussion pertaining to the first exemplary embodiment, above and unless specified otherwise, or readily apparent otherwise to a person skilled in the art, like elements in this exemplary embodiments may have any of the forms or functions described above in connection with the first exemplary embodiment.

In this example, the communication entity 205 is a piece of hardware that implements the functionality of a connectivity service such as IPTV or VoIP. An exemplary arrangement is shown in FIG. 8. For illustrative purposes a VoIP telephone 130B is used as an example. The VoIP telephone 130B depicted here is a digital telephone designed for VoIP communication, although a POTS-type phone with an ATA would function in a similar way. The VoIP telephone 130B communicates with the network access component 105 over the local link 175 and may comprise an interface for interfacing with the network access component 105 via the local link 175.

In the present example, the identifier 215 takes the form of a unique hardware identifier 815. A hardware identifier can be any identifier that is uniquely and permanently associated with a particular piece of hardware. In this case, the hardware identifier 815 is associated with the VoIP telephone 130B. It should be understood that the term "unique" is used here in relative terms and it is not necessary for the hardware identifier 815 to be universally unique. The hardware identifier 815 can be unique within a certain domain such as within the customer premise 110 or within a particular set of devices or customer domains expected to be served by a particular server 120 or carrier. Furthermore, the hardware identifier 815 may be imperfectly unique, even within a given domain, if the probability of repeated hardware identifiers is relatively low. In addition, the hardware identifier could be unique insofar as it varies according to a pattern that is itself "unique", as defined herein. It should also be understood that the term "permanent" is also used here in relative terms, and it is not necessary for the hardware identifier 815 to be completely static for all time. For example, the hardware identifier 815 may remain the same for the particular piece of hardware it is associated with until reprogrammed, e.g. by an operator. Generally speaking, however, the hardware identifier 815 is said to be permanent because it may remain the same for the duration of the piece of hardware's life or a significant portion thereof. The hardware identifier 815 could also be permanent insofar as it varies according to a pattern that is itself "permanent", as defined herein. Accordingly, in a suitable, non-limiting example, the hardware identifier 815 that designates VoIP telephone 130B can be the MAC (media access control) address of the VoIP telephone 130B.

As described above, the local link 175 can be any suitable connection between the network access component 105 and the VoIP telephone 130B. In the present example, the local link 175 is an Ethernet link through which packet-based communication is established using known protocols. In the present example, the MAC address of the VoIP telephone 130B is included with every data packet sent from the VoIP telephone 130B to the network access component 105.

In the present example, the MAC address of the VoIP telephone 130B is used as the hardware identifier 815 and is known by the server 120 to be associated with a particular priority level for the data sent from the VoIP telephone 130B. As such, unlike in the first exemplary embodiment, it is not up to the VoIP telephone 130B to request an identifier from the server 120. Rather, the server 120 is previously made aware of the hardware identifier 815 (here, the MAC address of the VoIP telephone 130B) and its associated particular priority level.

In the present example, the hardware identifier 815 is known to the server 120 because it has been previously provided thereto. Any suitable way of providing the hardware identifier 815 to the server 120 may be used, and the hardware identifier 815 may be provided to the server 120 from any of a variety of sources. In the present example, the VoIP telephone 130B is one of a large number of VoIP telephones provided by the carrier (or by another entity) each having a known MAC address. The MAC addresses (or other hardware identifiers) of all the VoIP telephones (or other device types) provided by the carrier (or another entity) may all have a common portion, such as a common prefix. These identifiers of the VoIP telephones are provided to the server 120 by a network management entity such as a network technician directly accessing the server 120 or by a network management computer communicating with the server 120, e.g. over the data network 115. The server 120 populates the identifier database 610 with the identifiers received and an association to a particular priority level for each identifier. In a non-limiting example, the carrier may come out with a new line of VoIP telephones and a decision is made by the carrier that any data they transmit over the data network 115 should be provided a given priority level (say, priority "4"). MAC addresses of all the VoIP telephones (or simply their common prefix) in the product line are entered, along with the associated priority level ("4"), into the server 120 by a technician. The server 120 updates its identifier database 610 to include the identifiers received and their respective priority levels.

Figure 9:
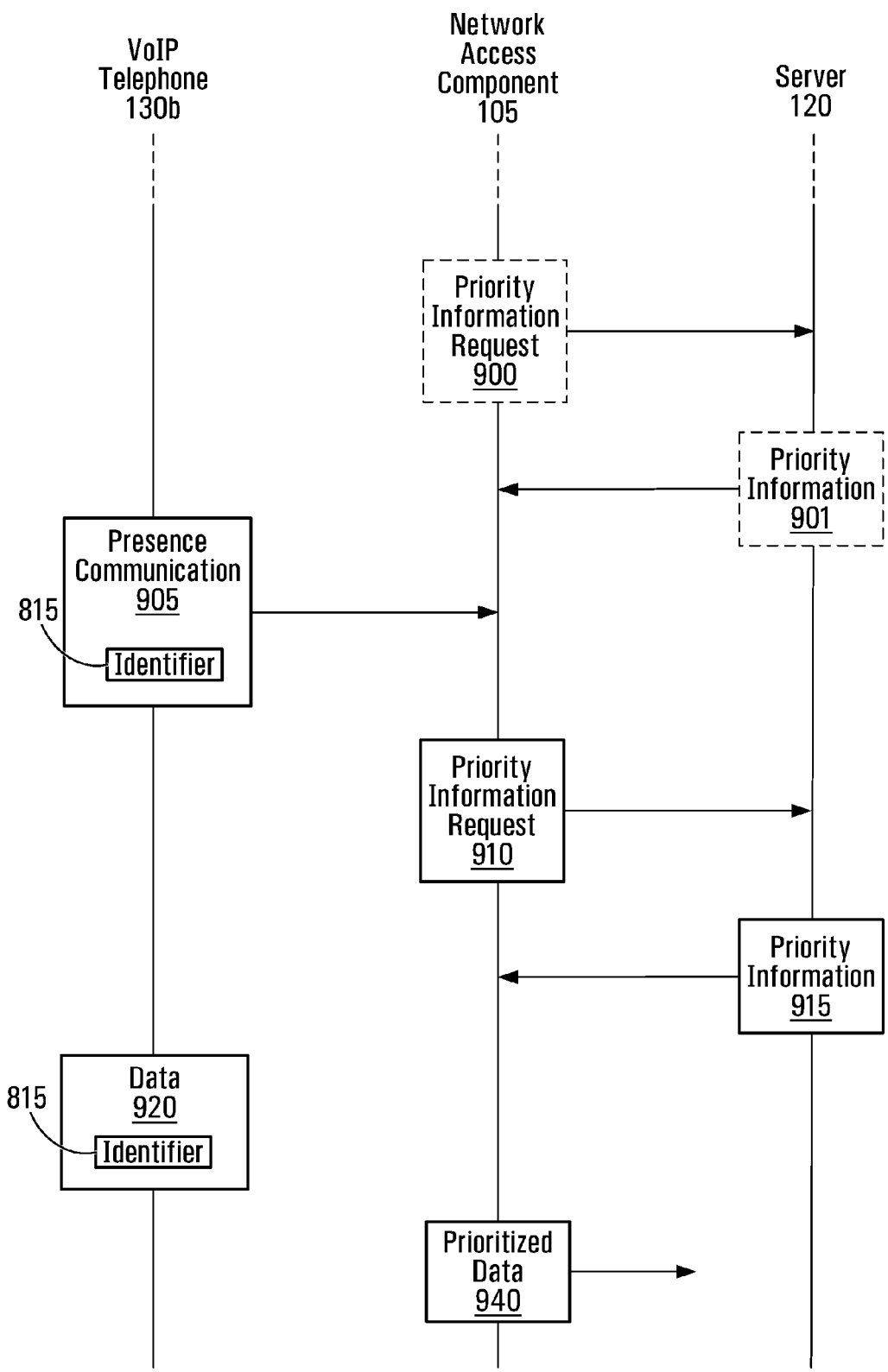
FIG. 9 shows a message flow diagram among the VoIP telephone, the network access component and the server shown in FIG. 2 in accordance with a the second exemplary embodiment.

FIG. 9 illustrates an exemplary flow of events corresponding to a particular embodiment of the second example described here. Conveyance by the network access component 105 of a priority information request 900 shown here is optional and can be done in any manner described above in relation to the priority information request 510. For example, the network access component 105 may, upon initialization, send a request for all identifiers it should be on the lookout for. In a non-limiting example, the priority information request 900 may include the hardware identifiers of devices that the network access component 105 has previously been (or is currently) connected to. To this end, the processing element 305 of the network access component 105 may configured to automatically accumulate the hardware addresses (or identifiers) of communication entities with which the network access component 105 connects and to store these hardware identifiers in the memory element 320. Alternatively, the server 120 may keep track of which devices have been connected to the network access component 105, in which case the priority information request 900 only needs to contain sufficient information for the server 120 to identify the network access component 105. As with the priority information request 510, the priority information request 900 may be conveyed in response to various triggers. In this case, the priority information request 900 is conveyed responsive to the initialization of the network access component 105. Alternatively, priority information requests may be triggered periodically to maintain an updated local identifier database 321.

Upon receiving the priority information request 900, the server 120 may identify any communication entity expected to be connected to the network access component 105 and determines a hardware identifier and an associated priority level for each such communication entity. The determined hardware identifier(s) and associated priority level(s) is(are) then conveyed back to the network access component 105 as priority information 901. There may be other triggers for the conveyance of the priority information 901, which conveyance is not necessarily solicited by the network access component 105. Other triggers have been suggested above and include periodic updates of the priority information provided to the network access component 105. The server 120 may also send the priority information 901 to the network access component 105 upon receipt of new hardware identifiers (e.g. entered into the server 120 by a technician, as described above) or other updates of the identifier database 610. It should be noted that the priority information request 900 is optional, and may be completely absent in an embodiment where priority information is, for example, only sent to the network access component 105 periodically and not responsive to a specific request.

In the present example, when the local link 175 is initialized, for example when the communication entity 205 is initialized or when it is first connected to the network access component 105, the VoIP telephone 130B communicates its presence to the network access component 105 in a presence communication 905 (sometimes referred to as a "discovery" stage). The presence communication 905 can be any initial communication with the network access component 105. For example, the presence communication 905 may be part of a discovery or handshaking procedure between the network access component 105 and the VoIP telephone 130B. As shown in FIG. 9, in this example, the presence communication 905 includes the hardware identifier 815 of the VoIP telephone 130B. Alternatively, the presence communication 905 may not include the hardware identifier 815 or may be completely absent. In this case, the hardware identifier 815 may first be communicated with the first envoy of data (e.g., VoIP data) from the communication entity 205 or the network access component 105 may request the hardware identifier 815 from the VoIP telephone 130B upon establishment of the local link 175.

Here, however, the presence communication 905 comprises the hardware identifier 815. Upon receipt of the hardware identifier 815, the processing element 305 of the network access component 105 proceeds to verify whether it knows the priority level associated with the received hardware identifier 815. To do so, the network processing element 305 may consult the local identifier database 321. In this example, the local identifier database 321 comprises priority information 901 that has previously been received from the server 120. In this example, the local identifier database 321 specifically stores hardware identifiers and associated respective priority levels. It may also include identifiers which do not have any associated priority levels.

In the present example, the hardware identifier 815 received in the presence communication 905 is not found by the processing element 305 to be in the local identifier database 321. The processing element 305 generates a new priority information request 910 specifically to obtain the priority level, if any, associated with the hardware identifier 815. The priority information request 910 includes the hardware identifier 815. Although the priority information request 910 was generated because the hardware identifier 815 was found to be absent from the local identifier database 321, a similar request may be generated even if the hardware identifier 815 is present in the local identifier database 321, for example if the hardware identifier 815 has been in the local identifier database 321 for a certain amount of time without having been updated.

Assuming that the server 120 has, upon receipt of the priority information request 910, determined that the hardware identifier 815 is associated with a given priority level, the server 120 sends priority information 915 to the network access component 105 in response to the request 910. The priority information 915 may include only an indicator of the given priority level. Optionally, the response 915 may also include the hardware identifier 815 as well, to avoid potential confusion if multiple priority information requests are pending. In an alternate simple embodiment where only two priority levels are used, the response 915 may be Boolean: "yes" this is priority data or "no" it isn't.

When the VoIP telephone 130B engages in a communication session, data 920 is sent to the network access component 105 in much the same manner as described above in respect of data 220. In particular, data 920 may be packetized or otherwise arrive in discrete increments and the hardware identifier 815 is included with the data. In the present example, data 920 is packet data and comprises data packets each having a header and a payload. The data 920 may comprise connectivity service data (in this case, VoIP data) in the payload of the packet. Since in this example the hardware identifier 815 is a MAC address and the communication link 175 is an Ethernet link, the hardware identifier 815 may be included with every packet of data sent from the VoIP telephone 130B. However, the data 920 may be sent in other forms, including non packet-based forms. Furthermore, as mentioned above, in other examples, the hardware identifier 815 may be another unique identifier identifying the VoIP telephone 130B and this identifier may be sent by any suitable means with the data 920, such as by any of the methods described above in the discussion pertaining to the first exemplary embodiment.

Upon receiving the data 920, the processing element 305 of the network access component 105 identifies the hardware identifier 815 received therewith and attempts to find it in the local identifier database 321 to find a respective priority level associated with the hardware identifier 815. In this example, the hardware identifier 815's priority level has been previously received with priority information 915 and the hardware identifier and associated priority level are both stored in the local identifier database 321. The processing element 305 therefore finds the hardware identifier 815 in the list 321 and also obtains from the list the priority level associated with the hardware identifier 815. Had the hardware identifier 815 not been found in the local identifier database 321 (e.g. if the presence communication 905 had never take place, and the hardware identifier 815 had never been received by the network access component 105), the processing element 305 may then have generated another priority information request, similar to priority information request 910, specifically to obtain the priority level, if any, associated with the hardware identifier 815. Alternatively, if the hardware identifier 815 is not found in the list 321, the data sent with the hardware identifier 815 may be assumed to be associated with a low priority level.

Once a priority level associated with the hardware identifier 815 received with data 920 has been determined, the data 920 may be prioritized and forwarded as prioritized data 940 in much the same manner as described above in the discussion pertaining to the first exemplary embodiment. For example, prioritizing the data 920 can involve special processing of the data 920 by the processing element 305 or any other operation that will affect the manner in which the data 920 is conveyed to its destination. For example, the processing element 305 may treat the data 920 with an urgency that depends upon the given priority level, for example by placing the data 920 in a particular queue that is "popped" with a frequency corresponding to the given priority level (alternatively, the data 920 could also be placed in a position in a queue proportional to the given priority level such that it exits the queue ahead of other data).

Prioritizing the data 920 can also involve its modification by the network access component 105. In a non-limiting example, certain fields of the data 920 may be modified to signal certain QoS requirements to network equipment in the data network 115. For example, if DiffServ values (or similar QoS indicators) are used in the data network 115 to provide differentiated service, the network access component 105 may choose to set the DiffServ value (or similar QoS indicator) contained in the headers of the packets in the data 920 to a value indicative of the differentiated service (i.e. priority level) required for the data 920. This can be done by simply adding (or overwriting) a DiffServ value (or similar QoS indicator) to the data 920 (e.g. in the headers of the packets in the data 920). Alternatively, a sufficiently high priority level associated with the identifier 815 or other condition may indicate that the communication entity 205 which has originated the data 920 (in this case, the VoIP telephone 130B) can be "trusted" to set the DiffServ value (or similar QoS indicator) for the data 920 (i.e. the DiffServ value received with the data 920 is to be trusted). For example, the network access component 105 may selectively accept the DiffServ value (or similar QoS indicator) and forwards the data 920 with the DiffServ value (or similar QoS indicator) unchanged if the priority level of the data 920 is sufficiently high (e.g. is above a certain threshold). Otherwise, the network access component 105 can delete the DiffServ value (or similar QoS indicator) or overwrite it with a default DiffServ value (or similar QoS indicator) or a DiffServ value (or similar QoS indicator) selected based on the priority level of the data 920. In this manner, as in the first example provided, the network access component 105 can serve as a gateway to a data network 115 where DiffServ values (or similar QoS indicators) can be trusted, addressing the problem of untrustworthy communication entities illegitimately availing themselves of high-priority service. Advantageously, as in the first example provided, the network access component 105 may protect the data network 115 from inappropriate use of its differentiated services by ensuring that the DiffServ value (or similar QoS indicator) of all data flowing into the data network 115 via the network access component 105 is accorded a DiffServ (or similar QoS indicator) value received from or approved by a trusted source, such as the server 120.

As in the first example provided, the prioritized data 940 is forwarded by the network access component 105 over the data network 115 in any suitable manner or format as determined by the particular communication arrangement and technology used. Prioritizing the data 920 can dictate a special forwarding scheme, such as forwarding the data 920 in a particular way or format or even over a particular network link, in an embodiment where multiple such links are present (e.g. all associated with the same customer).

Although in this example, priority information such as priority information 901 and priority information 915 was received from the server 120, other embodiments may omit the server 120. For example, if the network access component 105 is furnished by the carrier that operates the data network 115, it may be furnished with the local identifier database 321 already populated with the information necessary for the processing element 305 to identify the priority level, if any, associated with any hardware identifier it might receive. For example, the local identifier database 321 may comprise a list of all existing hardware identifiers and respective priority levels. Alternatively, this list could be shortened by providing only a certain subset of hardware identifiers that share a priority level, such as a MAC address prefix that is common (and, optionally, unique) to all pieces of hardware having a certain priority level. Alternatively still, the list could contain only hardware identifiers associated with communication entities expected to communicate via the network access component 105. If a hardware identifier sought in the local identifier database 321 is not found therein (or is found not to be associated with any particular priority level), the processing element 305 may prioritize the corresponding data according to a default priority level. Thus it is to be appreciated that in the absence of server 120, the processing element 305 may verify hardware identifiers received with data against the local identifier database 321 to determine a priority level associated with the received data without consulting any external devices.

It is to be understood that although two particular examples of the present invention have been provided, many other possible embodiments are achievable, for example by substituting a certain aspect or format of a given example with another possible aspect or format as suggested herein or as would be known to be possible to a person skilled in the art. Furthermore, where no obvious incompatibilities are found, equivalent portions of the first and second example provided may be interchanged to obtain another embodiment.

In the second example provided, the communication entity 205 was a VoIP telephone 130B, and the identifier was a hardware identifier 815. It is to be understood, however, that in other embodiments, the communication entity 205 may not necessarily be a piece of hardware and, accordingly, the hardware identifier 815, may be replaced with other types of identifiers unique for the communication entity 205. For example, if the communication entity 205 is a software communication entity, the identifier may be a unique software identifier hardcoded within the software communication entity that may serve in much the same way as the hardware identifier 815 described above. In such a case the identifier, while known and recognized by the server 120, might not provided to the communication entity by the server 120.

Although the network access component 105 has been shown as separate from customer devices 130A-F, it should be understood that a network access component may be integral with a customer device. For example, a general-purpose computer such as computer 130A may incorporate the functionality of the network access component 105. For example, a hardware component may be provided on the motherboard of the general-purpose computer and communicate therewith over a built-in bus. In such a case, the local communication component 311 of the interface 310 may be adapted for communication over the bus. Similarly, the network access component 105 may take the form of an expansion card connected to a general-purpose desktop via a PCI local bus. Alternatively still, some or all of the functionality of the network access component 105 may be directly provided by the hardware of the general-purpose computer. The general-purpose computer may have a program stored in memory that instructs the general-purpose computer's central processing unit (CPU) to perform the functions of the processing element 305 described above. Likewise the memory element 320 storing the local identifier database 321 may simply be a portion of the memory that stores data and instructions for the general-purpose computer. In such a case, the local communication component 311 of the interface 310 may be a means of exchanging data with other software running on the general-purpose computer. The network communication component 312 of the interface 310 may include a physical connection for a network cable connected to the general-purpose computer, e.g., over a USB interface. As such, a network access component may be embodied by a combination of a software program installed on a general-purpose computer a USB network adapter. Although in the instant example functionality of the network access component 105 is provided by single consumer device, other consumer devices may be provided network access via a connection to the general-purpose computer. Furthermore, although in this example, the functionality of the network access component 105 is provided by a general-purpose computer, it is to be understood that other types of devices could similarly implement network access component functionality.

Although the examples provided herein were focused on a single customer with customer premise 110, and a single network access component, it is to be appreciated that the data network 115 may interconnect many such customer premises and may be linked to many network access components. As such, the server 120 may replicate the functionality shown here for each such network access component, the various databases in the server 120 being adapted to store information appropriately.

Furthermore, although in the examples provided a single carrier has been assumed, it is to be understood that the various aspects attributed to the carrier (such as operation of the server 120, operation of the data network 115 or providing the VoIP telephone 130B) could be performed by another entity under agreement with the carrier. For example, customers of another network, operated by the carrier but that is connected to the data network 115, could also be served by the server 120, for example under an agreement between the operators of the other network and the data network 115.

The various embodiments that have been presented herein were illustrated for the purpose of describing, but not limiting, the invention. Various modifications will become apparent to those skilled in the art and are within the scope of this invention, which is defined by the attached claims.

The invention claimed is:

1. A method comprising:
generating, at an access device at a customer premise, a request for priority information;
authenticating by the access device a trusted network server remote from the customer premise over the data network;
sending over a carrier network from the access device at a customer premise the generated request for priority information from the authenticated trusted network source remote from the customer premise, the priority information being indicative of an association between at least one hardware identifier and a respective priority level;
receiving the priority information from the trusted network source in response to the request;
determining a particular hardware identifier associated with data received from a communication entity;
determining a particular priority level specified by the trusted network source associated with the data based on the particular hardware identifier, the particular priority level specified by the trusted network source in the received priority information;
prioritizing at least a portion of the data on a basis of the particular priority level;
wherein the particular hardware identifier is a MAC address; and
wherein determining the priority level comprises:
consulting the priority information to determine whether the particular hardware identifier is one of the at least one identifier; and
responsive to determining that the particular hardware identifier is one of the at least one identifier, setting the particular priority level to be the priority level respectively associated with the particular hardware identifier.

2. The method as defined in claim 1, wherein determining a particular priority level associated with the data comprises looking up the particular hardware identifier in an identifier database to determine whether a priority level has been previously associated with the particular hardware identifier.

3. The method as defined in claim 2, wherein the identifier database comprises an association between the particular hardware identifier and the particular priority level.

4. The method as defined in claim 2, wherein determining the particular priority level comprises, responsive to determining that the particular hardware identifier has not been previously associated with any priority level, setting the particular priority level to be a default priority level.

5. The method as defined in claim 1, wherein determining the particular priority level comprises:
consulting the priority information to determine whether the particular hardware identifier is one of the at least one identifier; and
responsive to determining that the particular hardware identifier is not one of the at least one identifier, setting the particular priority level to be a default priority level.

6. The method as defined in claim 1, wherein the at least one identifier and respective priority level are included in the priority information.

7. The method as defined in claim 1, wherein prioritizing at least a portion of the data includes editing the data so as to include therein a particular priority indicator indicating the particular priority level for network equipment in a data network.

8. The method as defined in claim 7, wherein editing the data comprises overwriting a portion of the data comprising an initial priority indicator with the particular priority indicator.

9. The method as defined in claim 1, wherein prioritizing at least a portion of the data comprises:
identifying an initial priority identifier included with the data, the initial priority indicator indicating an initial priority level for network equipment in a data network;
determining whether the initial priority level corresponds to the particular priority level; and
if the initial priority level does not correspond to the particular priority level, overwriting the initial priority indicator with a particular priority indicator indicating the particular priority level.

10. The method as defined in claim 1, wherein prioritizing the at least a portion of the data includes placing the at least a portion of the data in a queue corresponding to the particular priority level.

11. The method as defined in claim 1, further comprising forwarding the at least a portion of the data over a data network.

12. The method as defined in claim 1, wherein the particular hardware identifier uniquely identifies the communication entity among a group of communication entities.

13. The method as defined in claim 1, wherein the method is executed by the access device at the customer premises, and wherein the communication entity is located at the customer premises.

14. The method as defined in claim 1, wherein one of the at least one identifier is associated with a communication entity expected by the trusted source to transmit data through the access device at the customer premise.

15. The method as defined in claim 14, wherein the communication entity expected by the trusted source to transmit data through the access device at the customer premise is known by the trusted source to have previously transmitted data through the access device at the customer premise.

16. The method as defined in claim 1, wherein the trusted network source is a server operated by a carrier controlling access to a data network.

17. The method as defined in claim 1, wherein the communication entity is a hardware communication service device.

18. The method as defined in claim 17, wherein the communication entity is a VoIP telephone.

19. The method as defined in claim 1, wherein the data includes communication service data.

20. The method as defined in claim 19, wherein the communication service data includes at least one of VoIP data and IPTV data.

21. The method as defined in claim 1, wherein the data is received prior to sending the request and wherein the request includes the particular hardware identifier.

22. The method as defined in claim 21, each of the at least one identifier having been included in the request.

23. The method as defined in claim 1, further comprising looking up the particular hardware identifier in a identifier database to determine whether a priority level has been previously known to be associated with the particular hardware identifier, wherein the request is sent responsive to determining that no priority level has been previously associated with the particular hardware identifier.

24. The method as defined in claim 23, wherein upon receipt of the priority information, the priority information is stored in the identifier database.

25. The method as defined in claim 1, wherein the request is sent subsequent to powering on of a access device at the customer premise.

26. A network access component for use at a customer premise, the network access component comprising:
an interface adapted to receive data destined to be forwarded over a data network from a communication entity at the customer premise; and
a processing element operative for:
generating a request for priority information, the priority information being indicative of an association between at least one hardware identifier and a respective priority level;
authenticating a trusted network server remote from the customer premise over the data network;
causing the interface to transmit the request to the authenticated trusted network server;
receiving priority information from the trusted network server in response to the request, the priority information being indicative of an association between at least one hardware identifier and a respective priority level;
determining from the data a particular hardware identifier associated with the data;
determining a particular priority level specified by the trusted network server associated with the data based on the particular hardware identifier, the particular priority level specified by the trusted network server in the received priority information;
prioritizing at least a portion of the data on a basis of the particular priority level;
wherein the particular hardware identifier is a MAC address; and wherein determining the priority level comprises:
consulting the priority information to determine whether the particular hardware identifier is one of the at least one identifier; and
responsive to determining that the particular hardware identifier is one of the at least one identifier, setting the particular priority level to be the priority level respectively associated with the particular hardware identifier.

27. The network access component as defined in claim 26, further comprising an identifier database storing an association between at least one identifier and a respective priority level.

28. The network access component as defined in claim 27, wherein the identifier database comprises an association between the particular hardware identifier and the particular priority level.

29. The network access component as defined in claim 27, wherein determining a particular priority level for the data comprises looking up the particular hardware identifier in the local identifier database to determine whether a priority level has been previously associated with the particular hardware identifier.

30. The network access component as defined in claim 27, wherein determining the particular priority level comprises responsive to determining that the particular hardware identifier has been previously associated with any priority level, setting the particular priority level to be a default priority level.

31. The network access component as defined in claim 26, wherein determining the particular priority level is done on the basis of the particular hardware identifier and the priority information.

32. The network access component as defined in claim 26, wherein the interface is further adapted to forward the at least a portion of the data over the data network, and wherein the prioritizing the at least a portion of the data comprises causing the interface to forward the at least a portion of the data over the data network.

33. The network access component as defined in claim 32, wherein the at least a portion of the data includes communication service data.

34. The network access component as defined in claim 33, wherein the communication service data includes at least one of VoIP data and IPTV data.

35. The network access component as defined in claim 26, wherein the interface comprises a local communication component adapted for exchanging information with the communication entity and a network communication component adapted for exchanging information over the data network.

36. The network access component as defined in claim 35, wherein the local communication component is adapted for communication over a local area network.

37. The network access component as defined in claim 35, wherein the network communication entity is adapted for communication with a packet-based data network.

38. The network access component as defined in claim 26, wherein the at least one identifier and the respective priority level are included in the priority information.

39. The network access component as defined in claim 26, wherein the particular hardware identifier uniquely identifies the communication entity among a group of communication entities.

40. The network access component as defined in claim 26, wherein the trusted network server is operated by a carrier controlling access to the data network.

41. The network access component as defined in claim 26, wherein the request for priority information includes the particular hardware identifier.

42. The network access component as defined in claim 26, further comprising a identifier database, the processing element being further operative for causing the priority information to be stored in the local identifier database.

43. The network access component as defined in claim 42, wherein the processing element is further operative for looking up the particular hardware identifier in the local identifier database and for causing the interface to transmit the request upon a failure to find the particular hardware identifier in the local identifier database.

44. The network access component as defined in claim 26, wherein the processing element is further operative for detecting establishment of a communication link between the interface and the communication entity.

45. The network access component as defined in claim 44, wherein the request for priority information is triggered by detection of establishment of the communication link between the interface and the communication entity.

46. The network access component as defined in claim 26, wherein the network access component is a broadband modem.

* * * * *